United States Patent
Ishii

(10) Patent No.: US 10,089,527 B2
(45) Date of Patent: Oct. 2, 2018

(54) IMAGE-PROCESSING DEVICE, IMAGE-CAPTURING DEVICE, AND IMAGE-PROCESSING METHOD

(71) Applicant: Panasonic Intellectual Property Corporation of America, Torrance, CA (US)

(72) Inventor: Yasunori Ishii, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 220 days.

(21) Appl. No.: 14/118,738

(22) PCT Filed: Mar. 8, 2013

(86) PCT No.: PCT/JP2013/001516
§ 371 (c)(1),
(2) Date: Nov. 19, 2013

(87) PCT Pub. No.: WO2013/145589
PCT Pub. Date: Oct. 3, 2013

(65) Prior Publication Data
US 2014/0211993 A1    Jul. 31, 2014

(30) Foreign Application Priority Data

Mar. 26, 2012    (JP) .................... 2012-070318

(51) Int. Cl.
*G06K 9/00*    (2006.01)
*H04N 5/232*    (2006.01)
(Continued)

(52) U.S. Cl.
CPC ............ *G06K 9/00624* (2013.01); *G06T 7/11* (2017.01); *G06T 7/187* (2017.01); *G06T 7/246* (2017.01);
(Continued)

(58) Field of Classification Search
CPC ........... H04N 5/23212; H04N 5/23229; H04N 5/23254; G06T 2207/10016; G06T 7/20;
(Continued)

(56) References Cited

U.S. PATENT DOCUMENTS 8,089,548 B2    1/2012    Ogura et al.
8,416,987 B2    4/2013    Tsuji
(Continued)

FOREIGN PATENT DOCUMENTS

JP    2005-309746    11/2005
JP    2010-67252    3/2010
(Continued)

OTHER PUBLICATIONS

International Search Report dated May 21, 2013 in International Application No. PCT/JP2013/001516.
(Continued)

*Primary Examiner* — Kenny Cese
(74) *Attorney, Agent, or Firm* — Wenderoth, Lind & Ponack, L.L.P.

(57) ABSTRACT

An image processing device includes: a reference area setting unit which sets a reference area including an indicated segment; an extraction unit which extracts an interest object feature quantity indicating a first feature from the reference area; an interest area setting unit which sets an area of interest in a third image, based on a relationship between a position of a feature point extracted from a feature area which is an area corresponding to an object of interest and included in a second image and a position of a feature point in the third image corresponding to the extracted feature point; and a tracking unit which determines for each of two or more of plural segments included in the area of interest with use of the interest object feature quantity whether the segment is a segment corresponding to the object of interest.

12 Claims, 14 Drawing Sheets

(51) Int. Cl.
*G06T 7/11* (2017.01)
*G06T 7/246* (2017.01)
*G06T 7/187* (2017.01)

(52) U.S. Cl.
CPC ..... *H04N 5/23229* (2013.01); *H04N 5/23254* (2013.01); *G06T 2207/10016* (2013.01); *G06T 2207/10024* (2013.01); *G06T 2207/20101* (2013.01)

(58) Field of Classification Search
CPC ......... G06T 2207/20104; G06T 7/2033; G06T 2207/30232; G06T 2207/20148; G06T 2207/30241; G06T 7/0081; G06T 7/408; G06T 2207/30242; G06T 7/11; G06T 7/246; G06T 7/187; G06K 9/00261; G06K 9/32; G06K 9/3233; G06K 9/4652; G06K 2009/3291; G06K 9/00288; G06K 9/00624; G08B 13/19608; G06F 17/30793; G06F 2203/04806
See application file for complete search history.

(56) References Cited

U.S. PATENT DOCUMENTS

| 8,472,671 | B2 | 6/2013 | Kubota | |
| 2007/0253596 | A1* | 11/2007 | Murata | G06K 9/6203 |
| | | | | 382/103 |
| 2010/0066843 | A1* | 3/2010 | Muramatsu | G01S 3/7865 |
| | | | | 348/208.14 |
| 2010/0166261 | A1 | 7/2010 | Tsuji | |
| 2010/0177234 | A1* | 7/2010 | Ogura | G06T 7/11 |
| | | | | 348/333.03 |
| 2011/0150280 | A1 | 6/2011 | Tsuji | |
| 2011/0255747 | A1* | 10/2011 | Iwasaki | G06K 9/00348 |
| | | | | 382/103 |
| 2012/0045094 | A1 | 2/2012 | Kubota | |
| 2012/0106794 | A1 | 5/2012 | Iwasaki et al. | |
| 2012/0134538 | A1* | 5/2012 | Kimura | G06K 9/00261 |
| | | | | 382/103 |
| 2013/0027579 | A1* | 1/2013 | Kinoshita | G03B 15/00 |
| | | | | 348/222.1 |
| 2014/0010409 | A1* | 1/2014 | Yamashita | 382/103 |

FOREIGN PATENT DOCUMENTS

| JP | 2010-157924 | | 7/2010 | |
| JP | 2011-134117 | | 7/2011 | |
| JP | 4784709 | B1 * | 10/2011 | |
| JP | WO 2011121917 | A1 * | 10/2011 | G03B 15/00 |
| JP | 2012-44428 | | 3/2012 | |
| WO | 2009/125596 | | 10/2009 | |
| WO | 2011/113444 | | 9/2011 | |

OTHER PUBLICATIONS

David G. Lowe, "Distinctive Image Features from Scale-Invariant Keypoints" International Journal of Computer Vision, 2004, Springer.
Herbert Bay et al., "Speeded-Up Robust Features (SURF)" Tinne Tuytelaars, ECCV 2006, Springer.

* cited by examiner

FIG. 6
(a) Before clustering (initial clusters)
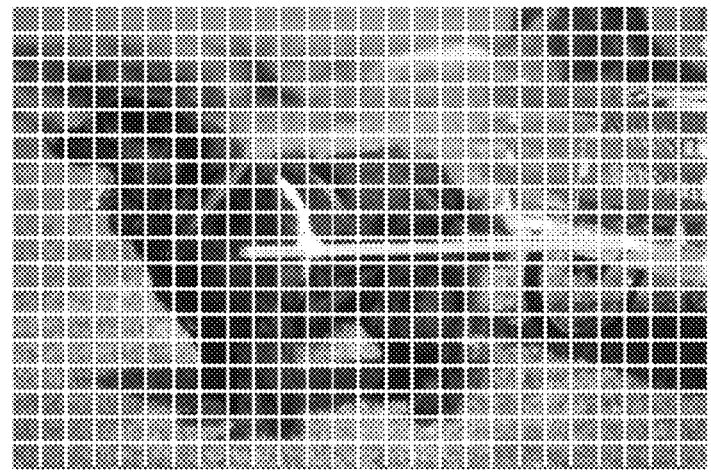
(b) After clustering
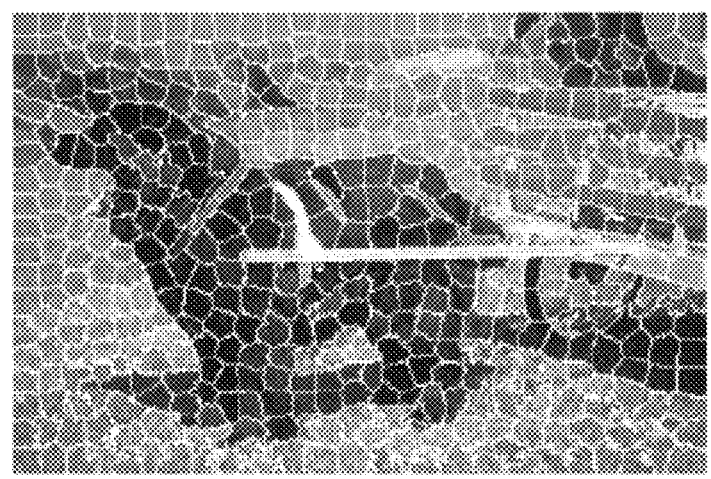

FIG. 9
(a)
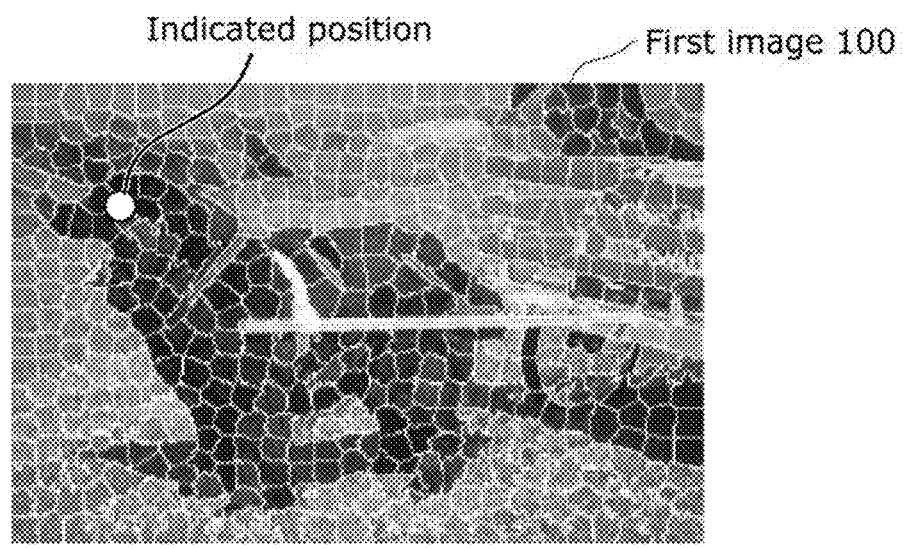
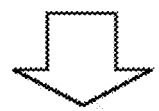
(b)
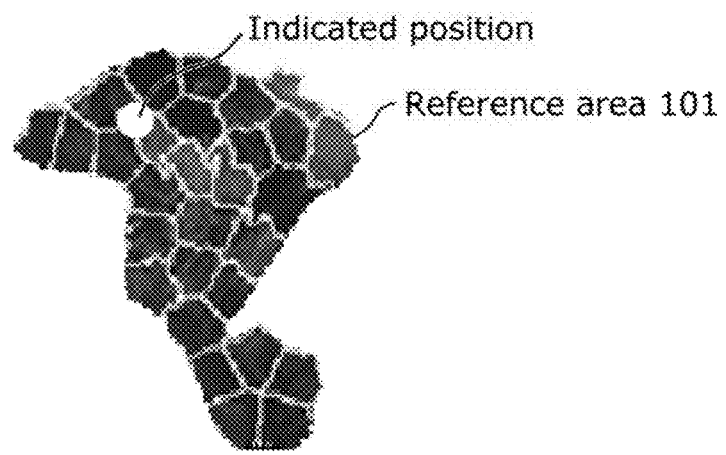

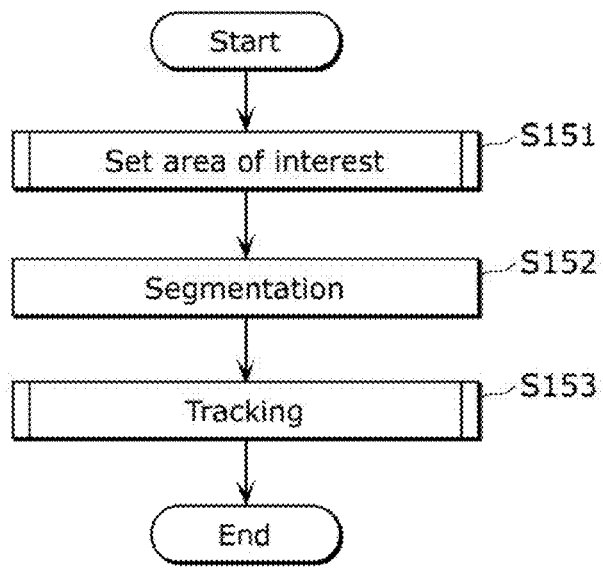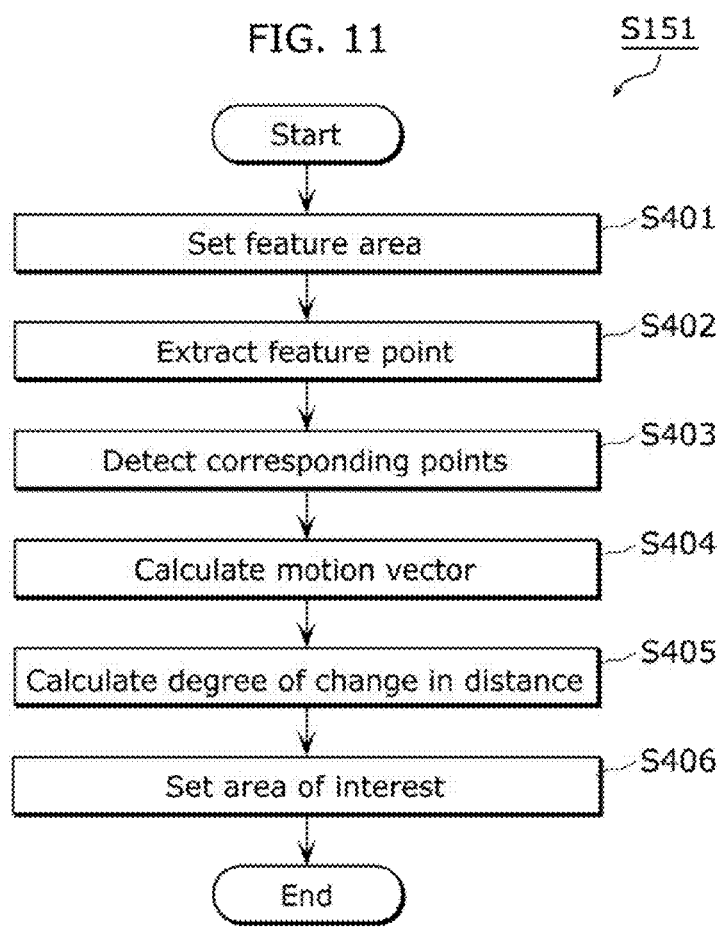

FIG. 15
(a) Second image
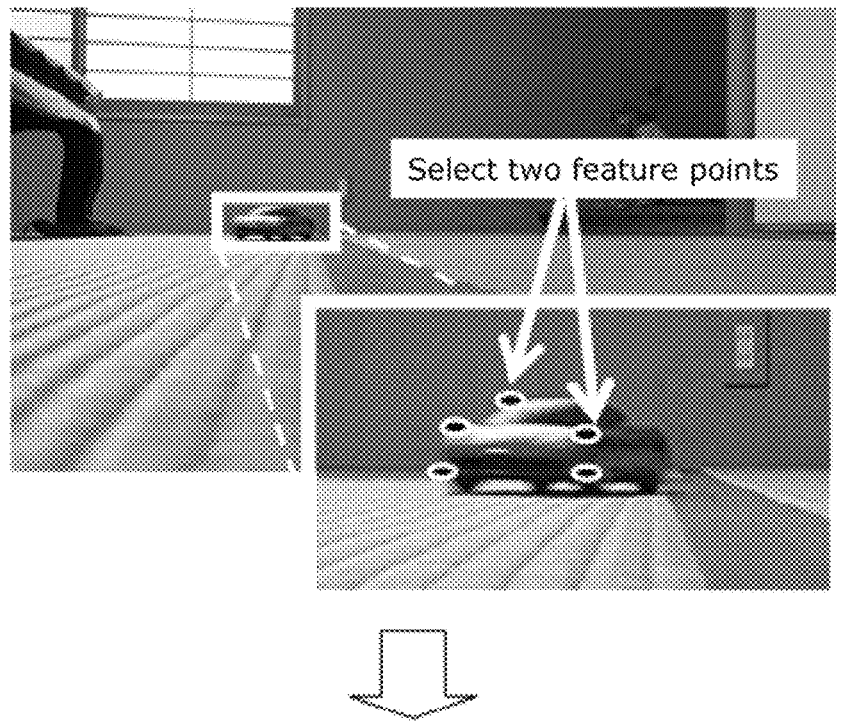
(b) Third image
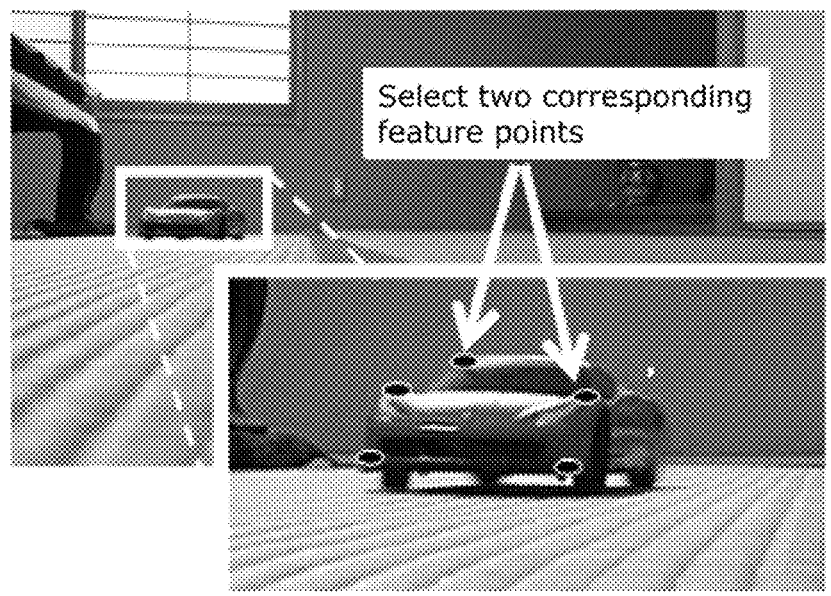

IMAGE-PROCESSING DEVICE, IMAGE-CAPTURING DEVICE, AND IMAGE-PROCESSING METHOD

TECHNICAL FIELD

The present invention relates to an image processing device, an imaging device, and an image processing method for tracking an object of interest included in a first image to locate the object of interest in a third image captured after the first image.

BACKGROUND ART

Techniques of automatically tracking an object of interest included in an image displayed on a display unit have been proposed (see PTL 1, for example).

CITATION LIST

Patent Literature

[PTL 1] International Patent Application Publication No. 2009/125596
[PTL 2] Japanese Unexamined Patent Application Publication No. 2010-157924

Non Patent Literature

[NPL 1] Distinctive Image Features From Scale-Invariant Keypoints, David G. Lowe, International Journal of Computer Vision, 2004, Springer
[NPL 2] Speeded Up Robust Features, Herbert Bay, Tinne Tuytelaars, ECCV 2006, Springer

SUMMARY OF INVENTION

Technical Problem

However, there has been a demand for such conventional techniques to achieve tracking an object of interest with higher accuracy.

In view of this, an object of the present invention is to provide an image processing device, an imaging device, and an image processing method which enable tracking an object of interest with high accuracy.

Solution to Problem

An image processing device according to an aspect of the present invention is an image processing device which tracks an object of interest included in a first image to locate the object of interest in a third image captured after the first image, the image processing device including: a segmentation unit configured to partition the first image and the third image each into plural segments, based on similarity between pixel values; an indication unit configured to indicate a position of the object of interest in the first image; a reference area setting unit configured to set, as a reference area, a segment set which includes an indicated segment that is one of the plural segments at the indicated position; an extraction unit configured to extract a feature quantity indicating a first feature from the reference area, as an interest object feature quantity; an interest area setting unit configured to set an area of interest in the third image, based on a relationship between a position of a feature point extracted from a feature area and a position of a feature point in the third image corresponding to the extracted feature point, the feature area being an area corresponding to the object of interest and included in a second image captured at a time different from a time at which the third image is captured; and a tracking unit configured to locate the object of interest in the third image by determining for each of two or more of the plural segments included in the area of interest with use of the interest object feature quantity whether the segment is a segment corresponding to the object of interest.

It should be noted that these general and specific aspects may be implemented using a system, a method, an integrated circuit, a computer program, a computer-readable recording medium such as a CD-ROM, or any combination of systems, methods, integrated circuits, computer programs and recording media.

Advantageous Effects of Invention

An aspect of the present invention enables tracking an object of interest with high accuracy.

BRIEF DESCRIPTION OF DRAWINGS

FIG. 6 shows examples of segmentation results according to Embodiment 1.
FIG. 9 illustrates an example of processing operation of the reference area setting unit according to Embodiment 1.
FIG. 10 is a flowchart showing processing for tracking an object of interest performed by the image processing device according to Embodiment 1.
FIG. 11 is a flowchart showing details of processing operation of an interest area setting unit according to Embodiment 1.
FIG. 15 illustrates an example of processing for calculating a degree of change in distance between feature points in Embodiment 1.

Figure 1:
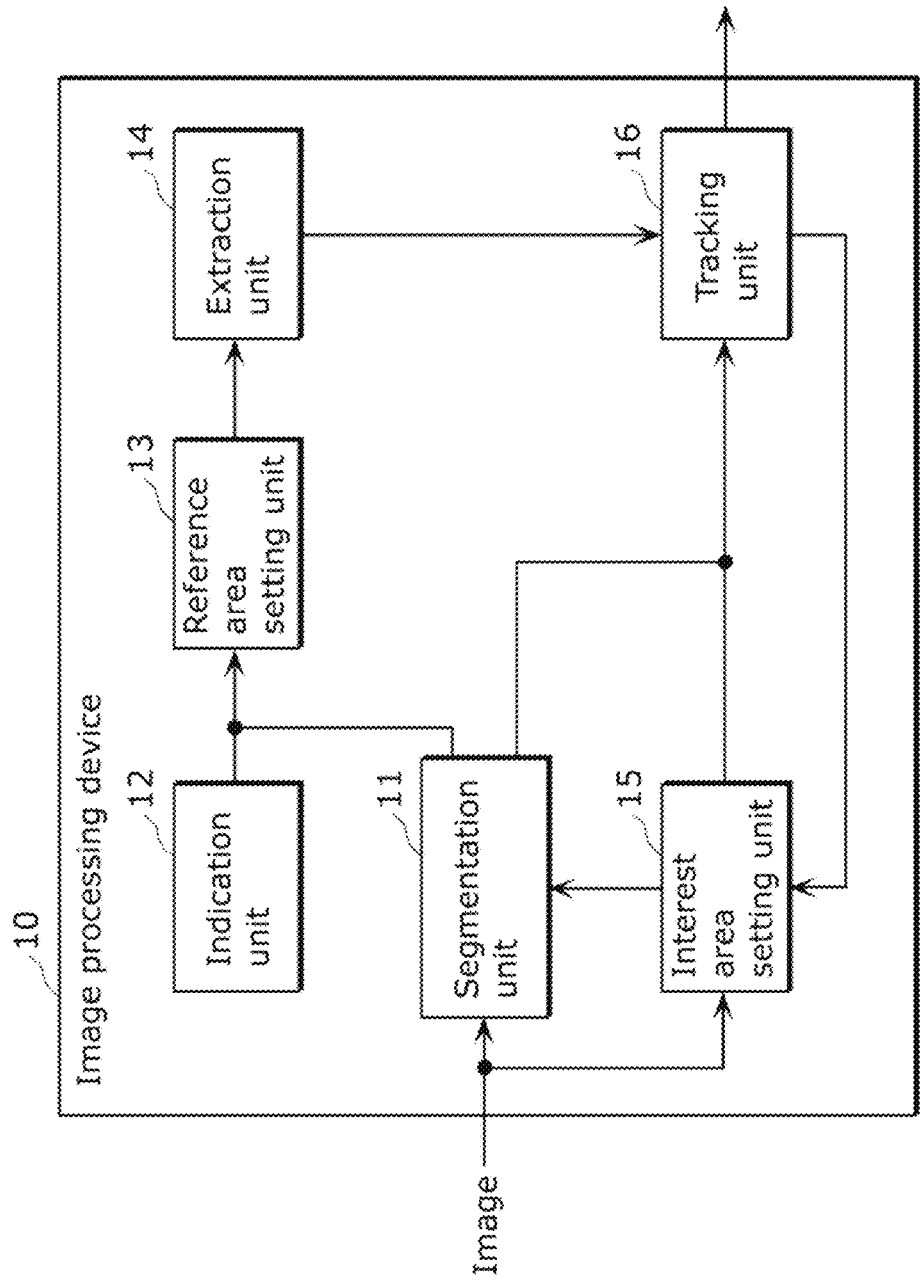
FIG. 1 is a block diagram illustrating a function configuration of an image processing device according to Embodiment 1.

DESCRIPTION OF EMBODIMENTS (Underlying Knowledge Forming Basis of the Present Invention)

Cameras which include a touch screen for displaying an image in real time (such as digital still cameras and digital video cameras) have been widely used. A user can take a picture or video, checking an image displayed on the touch screen. In addition, the user can indicate the position of an object to which the user pays attention (object of interest) in the image displayed on the touch screen by touching the touch screen.

If the position of an object to which the user pays attention is indicated, the camera executes autofocus (AF), automatic exposure (AE), and others utilizing a feature quantity extracted from an area around the position. As a result, the camera can take a picture or video suitable for the object to which the user is paying attention.

Here, for example, if the object of interest moves or the camera is moved after executing AF, the object of interest in focus is brought out of focus. In view of this, a method for automatically tracking an object of interest included in an image displayed on a touch screen, for instance, has been proposed (see PTL 1, for example.

The camera can automatically bring the object of interest into focus by executing AF again utilizing a feature quantity extracted from an area corresponding to an object of interest tracked in the above manner, even if the object of interest moves or the camera is moved.

However, in the method of PTL 1, the shape of an area from which a feature quantity is extracted is predetermined (rectangular, elliptical, or the like), and thus if the shape of an object of interest is different from the predetermined shape, a camera cannot appropriately extract a feature quantity of the object of interest. As a result, the camera cannot track the object of interest accurately.

Furthermore, PTL 2 discloses a method for correcting a tracking position when the tracking position of an object of interest shifts. With the method of PTL 2, however, it is difficult to correct a tracking position if the shape of an object of interest greatly changes.

In view of this, an image processing device according to an aspect of the present invention is an image processing device which tracks an object of interest included in a first image to locate the object of interest in a third image captured after the first image, the image processing device including: a segmentation unit configured to partition the first image and the third image each into plural segments, based on similarity between pixel values; an indication unit configured to indicate a position of the object of interest in the first image; a reference area setting unit configured to set, as a reference area, a segment set which includes an indicated segment that is one of the plural segments at the indicated position; an extraction unit configured to extract a feature quantity indicating a first feature from the reference area, as an interest object feature quantity; an interest area setting unit configured to set an area of interest in the third image, based on a relationship between a position of a feature point extracted from a feature area and a position of a feature point in the third image corresponding to the extracted feature point, the feature area being an area corresponding to the object of interest and included in a second image captured at a time different from a time at which the third image is captured; and a tracking unit configured to locate the object of interest in the third image by determining for each of two or more of the plural segments included in the area of interest with use of the interest object feature quantity whether the segment is a segment corresponding to the object of interest.

This configuration allows a reference area to be set utilizing plural segments obtained by partitioning the first image based on the similarity between pixel values. Thus, even when an object of interest has a complicated geometrical shape, a reference area can be set which has a shape suitable for such a complicated geometrical shape. As a result, a feature quantity of the object of interest can be extracted more appropriately than when extracting a feature quantity from an area having a predetermined shape. Consequently, the use of the feature quantity of the object of interest extracted in such a manner enables tracking the object of interest with high accuracy.

Furthermore, this configuration allows determination to be made for each segment included in an area of interest using an interest object feature quantity as to whether the segment is a segment corresponding to an object of interest. Thus, an object of interest can be tracked more robustly against a change in the shape of the object of interest between images than when matching segments in a reference area and segments in an area of interest one by one. This allows tracking an object of interest with high accuracy even when the shape of the object of interest changes between images. Further, an area on which determination processing is to be performed can be limited to segments in an area of interest, thus achieving a reduction in processing load and an increase in processing speed.

Furthermore, according to this configuration, an area of interest can be set in the third image, based on a relationship between a position of a feature point extracted from the feature area in the second image and a position of a feature point in the third image corresponding to the extracted feature point. Thus, even when the object of interest moves between the second and third images, an area of interest can be set appropriately and easily, utilizing a correspondence between the feature points in the second and third images. As a result, it is possible to prevent an incorrect determination that a segment at a position distant from the object of interest is a segment corresponding to the object of interest. Thus, even when the object of interest moves between images, the object of interest can be tracked with high accuracy.

For example, the interest area setting unit may be configured to detect, in the third image, a feature point corresponding to the feature point extracted from the feature area in the second image, based on a feature quantity indicating a second feature different from the first feature, and set the area of interest to be at a position according to a motion vector obtained from the detected feature point in the third image and the feature point extracted from the feature area.

This configuration allows an area of interest to be set at a position according to a motion vector obtained from a corresponding point detected based on a feature quantity indicating the second feature different from the first feature. Thus, different feature quantities can be utilized for a feature quantity for setting an area of interest and a feature quantity for the determination of a segment corresponding to an object of interest. Consequently, the robustness against a change in feature of an object of interest (in particular, a change in the position of the object of interest) can be improved.

For example, the interest area setting unit may be configured to detect, in the third image, plural feature points corresponding to a plurality of the feature points extracted from the feature area, based on a feature quantity indicating a second feature different from the first feature, and set the area of interest to have a size according to a degree of change in a distance between the detected plural feature points in the third image relative to a distance between the plurality of feature points extracted from the feature area in the second image.

This configuration allows setting of an area of interest having a size according to a degree of change in the distance in an image between feature points detected based on a feature quantity indicating a second feature different from the first feature. In other words, different feature quantities can be utilized for a feature quantity for the determination of a segment corresponding to an object of interest, and a feature quantity for setting an area of interest. This achieves an improvement in robustness against a change in the feature of an object of interest (in particular, a change in the size of the object of interest).

For example, the feature area may include at least one segment corresponding to the object of interest, and be larger than the at least one segment corresponding to the object of interest.

This configuration allows a feature area where a feature point is extracted to be larger than an area corresponding to the object of interest. In general, a feature point having a distinctive feature quantity tends to be extracted at a position where a pixel value greatly changes such as a boundary of an object. Consequently, a feature area is made larger than the area corresponding to an object of interest such that the boundary of the object of interest is included, thereby achieving an improvement in the accuracy of detecting corresponding points.

For example, the segmentation unit may be configured to partition only the area of interest in the third image into plural segments.

This configuration allows only the area of interest in the third image to be segmented, thus achieving a reduction in an amount of calculation for segmentation and an increase in the processing speed.

For example, when the reference area includes plural segments, the extraction unit may be configured to extract, as the interest, object feature quantity, a representative value of plural feature quantities extracted from the plural segments.

This configuration allows extraction of a representative value of plural feature quantities extracted from plural segments, as an interest object feature quantity. Consequently, a reduction in processing load and/or an increase in processing speed can be achieved when it is determined for each segment included in an area of interest using the interest object feature quantity, whether the segment is a segment corresponding to an object of interest.

For example, the extraction unit may be further configured to extract, as a non interest object feature quantity, a feature quantity indicating the first feature from an area outside the reference area, and the tracking unit may be configured to determine, for each of the two or more segments included in the area of interest, whether the segment is a segment corresponding to the object of interest, by determining, for each of feature quantities indicating the first feature and extracted from the two or more segments, whether the feature quantity is similar to the interest object feature quantity or to the non interest object feature quantity.

According to this configuration, it can be determined for each segment whether the segment is a segment corresponding to an object of interest by determining whether a feature quantity indicating the first feature and extracted from the segment is similar to an interest object feature quantity or to a non-interest object feature quantity. Consequently, determination accuracy can be improved compared to when a determination is made using only an interest object feature quantity, and thus it is possible to track an object of interest with high accuracy.

For example, when the area outside the reference area includes plural segments, the extraction unit may be configured to extract a representative value of plural feature quantities extracted from the plural segments, as the non interest object feature quantity.

This configuration, allows a representative value of plura feature quantities extracted from plural segments can be extracted as a non interest object feature quantity. Consequently, when it is determined for each segment included in an area of interest, using a non interest object feature quantity whether the segment is a segment corresponding to the object of interest, a reduction in processing load and/or an increase in processing speed can be achieved.

For example, the first image, the second image, and the third image may be included in a video.

This configuration enables tracking an object of interest in a video.

An imaging device according to an aspect of the present invention includes: the image processing device; and an imaging unit configured to capture the first image, the second image, and the third image.

This configuration achieves equivalent effects as those of the image processing device described above.

It should be noted that these general and specific aspects may be implemented using a system, a method, an integrated circuit, a computer program, a computer-readable recording medium such as a CD-ROM, or any combination of systems, methods, integrated circuits, computer programs or recording media.

The following specifically describes an image processing device and an imaging device according to an aspect of the present invention, with reference to the drawings.

The exemplary embodiments described below each show a general or specific example. The numerical values, shapes, materials, constituent elements, the arrangement and connection of the constituent elements, steps, the processing order of the steps, and the like shown in the following embodiments are mere examples, and thus are not intended to limit the scope of the claims. Thus, among the constituent elements in the following exemplary embodiments, constituent elements not recited in any of the independent claims defining the most generic part of the inventive concept are described as arbitrary constituent elements.

Embodiment 1

FIG. 1 is a block diagram showing a functional configuration of an image processing device 10 according to Embodiment 1. The image processing device 10 tracks an object of interest included in a first image to locate the object of interest in a third image captured after the first image.

As shown in FIG. 1, the image processing device 10 according to the present embodiment includes a segmentation unit 11, an indication unit 12, a reference area setting unit 13, an extraction unit 14, an interest area setting unit 15, and a tracking unit 16.

The segmentation unit 11 partitions the first image and the third image each into plural segments, based on the similarity between pixel values. In other words, the segmentation unit 11 partitions the first image and the third image each into plural segments so that pixels having pixel values similar to one another are included in one segment.

Here, a segment corresponds to a partial area in an image. In addition, processing of partitioning an image into plural segments is also referred to as segmentation, below.

A pixel value is a value of a pixel making up an image. A pixel value is a value indicating the luminance, color, lightness, hue, saturation of a pixel, or a combination of those, for example.

In the present embodiment, the segmentation unit 11 partitions an image into plural segments, based on color similarity.

For example, the segmentation unit 11 partitions an image into plural segments by clustering based on the similarity defined using a color and a pixel position.

The indication unit 12 indicates the position of an object of interest in the first image. For example, the indication unit 12 receives input for indicating the position of an object of interest in the first image from a user via an input device (such as a touch screen). Then, the indication unit 12 indicates the position of the object of interest, based on the received input. For example, the indication unit 12 may indicate a predetermined position (for example, center position or the like) in the first image as a position of an object of interest. For example, the indication unit 12 may indicate the position of an object (for example, a face of a person or the like) automatically detected in the first image as a position of an object of interest. The position indicated by the indication unit 12 is hereinafter referred to as an indicated position.

The reference area setting unit 13 sets a segment set including an indicated segment, as a reference area. An indicated segment is a segment at an indicated position. In addition, a segment set is a set including at least one segment. In the present embodiment, the reference area setting unit 13 sets, as a reference area, a segment set forming one continuous area, and including an indicated segment and a similar segment having a value greater than a threshold value, the value indicating image similarity to the indicated segment.

It should be noted that the reference area setting unit 13 does not necessarily need to set a segment set including an indicated segment and a similar segment, as a reference area. For example, the reference area setting unit 13 may set a segment set including only an indicated segment, as a reference area.

The extraction unit 14 extracts a feature quantity indicating a first feature from a reference area, as an interest object feature quantity. Specifically, the extraction unit 14 extracts a feature quantity of each segment included in a reference area, as an interest object feature quantity.

Here, a first feature means a feature of an image. Further, a feature quantity is a value quantitatively indicating a feature of an image.

In the present embodiment, a feature regarding a color is utilized as the first feature. For example, the extraction unit 14 extracts a color histogram of each segment included in a reference area, as an interest object feature quantity. A color histogram shows frequencies corresponding to predetermined plural color types. The plural color types are predetermined using, for example, the range of hue (H) component values in hue-saturation-value (HSV) color space.

It should be noted that the plural color types do not necessarily need to be predetermined using the range of H component values in HSV color space. For example, the plural color types may be determined using the range of values obtained from H component values and at least lightness (V) component values or saturation (S) component values. In addition, the plural color types may be determined using component values in other color space (for example, red-green-blue (RGB) color space, YUV color space, Lab color space, or the like), rather than the component values in HSV color space.

The first feature does not necessarily need to be a feature regarding a color. For example, the first feature may be a feature regarding luminance or intensity, or a combination of a color and luminance or intensity.

The extraction unit 14 further extracts, as a non interest object feature quantity, a feature quantity indicating the first feature from the area outside a reference area. Specifically, the extraction unit 14 extracts a feature quantity of each segment included in the area outside the reference area, as a non interest object feature quantity. In the present embodiment, the extraction unit 14 extracts a color histogram of each segment, as a non interest object feature quantity.

For example, an area away from the reference area by a given distance or longer is utilized as an area outside a reference area. A given distance may be set such that an area having a feature different from an image feature of a reference area to some extent is utilized. In this manner, a non interest object feature quantity is extracted from an area away from the reference area by a given distance or longer, thereby preventing inclusion of a feature quantity of an object of interest in a non interest object feature quantity.

The interest area setting unit 15 sets an area of interest in the third image, based on a relationship between, a position of a feature point extracted from a feature area in the second image and a position of a feature point in the third image corresponding to the extracted feature point.

Specifically, the interest area setting unit 15 detects plural feature points in the third image corresponding to plural feature points extracted from a feature area in the second image, based on a feature quantity indicating a second feature. The interest area setting unit 15 sets an area of interest in the third image to be at a position according to motion vectors obtained from the plural feature points extracted from the feature area in the second image and the detected plural feature points in the third image, and furthermore to have a size according to a degree of change in the distance between the detected plural feature points in the third image relative to the distance between the plural feature points extracted from the feature area in the second image.

Here, the second image is an image captured at a different time from a time at which the third image is captured. It should be noted that the second image may be the same as the first image. For example, the second image and the third image are different images included in plural images captured in succession. For example, the second image and the third image may be included in a video. In this case, typically, the second image is an image in a frame temporally preceding a frame of the third image. It should be noted that the second image may be an image in a frame temporally succeeding a frame of the third image.

A feature area is an area corresponding to an object of interest. In other words, a feature area is an area which includes an object of interest. Specifically, a feature area is an area corresponding to an object of interest or is an area which includes an area corresponding to an object of interest and is larger than the area corresponding to the object of interest, for example.

The second feature is a feature different from the first feature. In the present embodiment, a feature regarding a shape is utilized as the second feature. It should be noted that the second feature does not necessarily need to be a feature regarding a shape. In addition, the second feature may be the same as the first feature.

A degree of change in distance is a value indicating the magnitude of change in distance. Specifically, a degree of change in distance indicates a proportion of change in distance or an amount of change in distance, for example.

Using the extracted interest object feature quantity and the extracted non interest object feature quantity, the tracking unit 16 determines for each segment included in an area of interest whether the segment is a segment corresponding to an object of interest, to locate the object of interest in the third image.

Here, a segment corresponding to an object of interest is a segment making up an image of an object of interest. In the following, a segment corresponding to an object of interest is simply referred to as an interest object segment.

For example, the tracking unit 16 determines for each segment included in an area of interest whether the segment is an interest object segment, by determining whether a feature quantity indicating the first feature extracted from the segment is similar to an interest object feature quantity or to a non interest object feature quantity.

It should be noted that in the present embodiment, as described above, a color histogram is used as a feature quantity indicating the first feature. For each segment included in an area of interest, the tracking unit 16 determines which of color histograms each extracted as an interest object feature quantity (interest object color histograms) and color histograms each extracted as a non interest object feature quantity (non interest object color histograms) is the most similar to a color histogram extracted from the segment. If the color histogram of a segment determined in this way is one of the interest object color histograms, the tracking unit 16 determines that the segment is an interest object segment, whereas if the color histogram of a segment determined in this way is one of the non interest object color histograms, the tracking unit 16 determines that the segment is not an interest object segment.

Here, the similarity between two color histograms is represented by the degree of overlap between the two color histograms. The degree of overlap between two color histograms indicates the amount of overlapping frequency of each color type of the two color histograms.

It should be noted that two color histograms are preferably normalized so as to have the same sum of frequencies. In this manner, the tracking unit 16 can calculate with ease a value indicating the similarity between two color histograms by adding a smaller one of two frequencies of each of all the color types.

Next is a description of processing operation of the image processing device 10 having the configuration as described above. Processing operation of the image processing device 10 is roughly divided into processing for extracting at least one feature quantity from a first image and processing for tracking an object of interest to locate the object of interest in a third image. First, a description is given of processing for extracting at least one feature quantity from the first image, with reference to the drawings.

Figure 2:
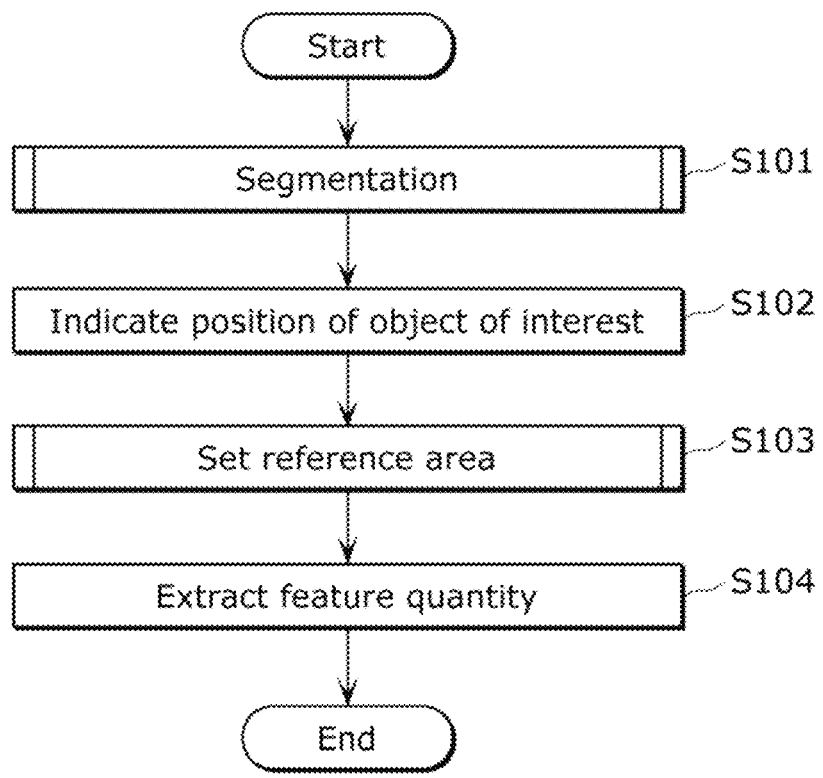
FIG. 2 is a flowchart showing processing for extracting a feature quantity performed by the image processing device according to Embodiment 1.

FIG. 2 is a flowchart showing processing for extracting at least one feature quantity from a first image performed by the image processing device 10 according to Embodiment 1.

First, the segmentation unit 11 partitions the first image into plural segments, based on the similarity between pixel values (S101). The indication unit 12 indicates the position of an object of interest in the first image (S102).

The reference area setting unit 13 sets, as a reference area, a segment set which includes at least a segment at the indicated position (S103). The extraction unit 14 extracts at least one interest object feature quantity from a reference area, and extracts at least one non interest object feature quantity from an area outside the reference area (S104).

In this way, the image processing device 10 can extract at least one interest object feature quantity and at least one non interest object feature quantity from the first image.

It should be noted that the image processing device 10 does not necessarily need to perform processing in order of the steps shown in FIG. 2. For example, the image processing device 10 may execute step S101 after step S102. Further, for example, the image processing device 10 may execute steps S101 and S102 in parallel.

In the following, a more detailed description is given of such processing for extracting at least one feature quantity from the first image, with reference to the drawings. First, segmentation processing (S101) is described in detail using FIGS. 3 to 6. It should be noted that here, a description is given of segmentation based on k-means clustering, as an example of segmentation.

Figure 3:
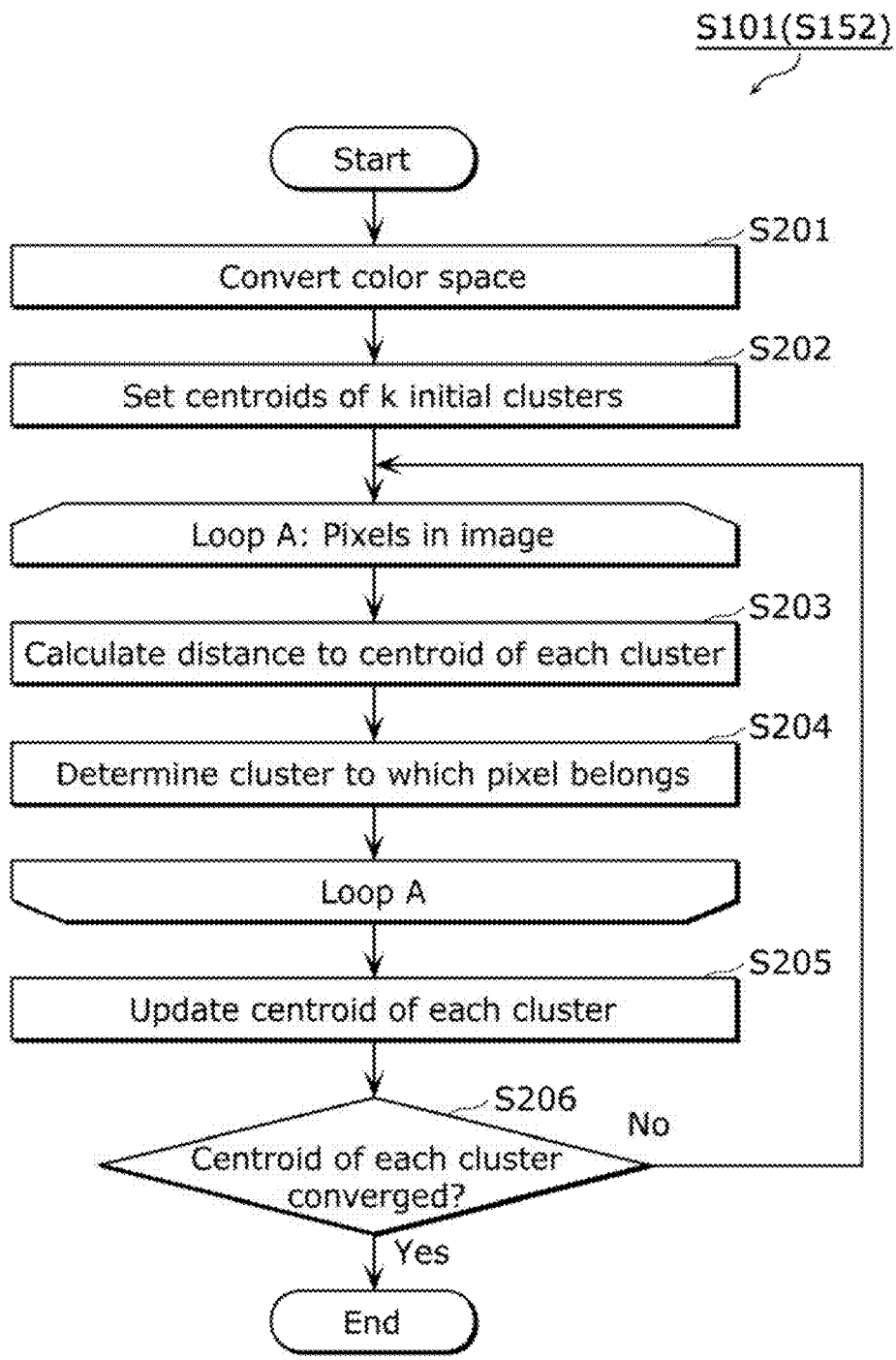
FIG. 3 is a flowchart showing details of processing operation of a segmentation unit according to Embodiment 1.
Figure 4:
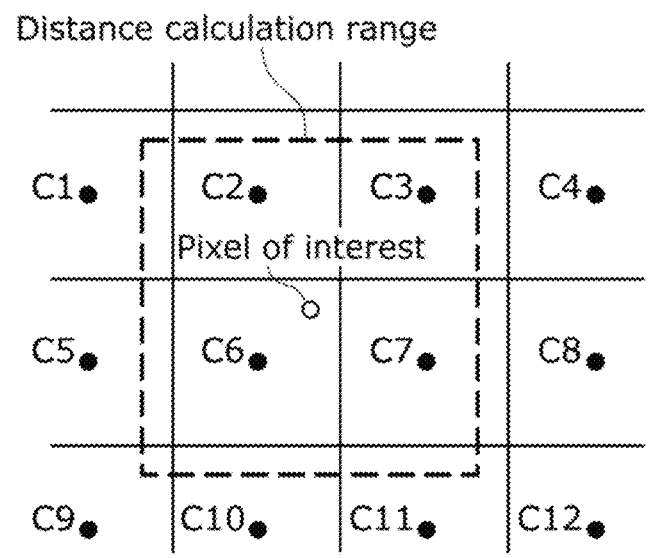
FIG. 4 illustrates an example of processing operation of the segmentation unit according to Embodiment 1.
Figure 5:
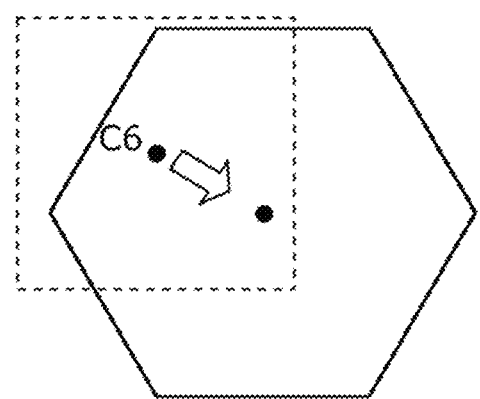
FIG. 5 illustrates an example of processing operation of the segmentation unit according to Embodiment 1.

FIG. 3 is a flowchart showing details of processing operation of the segmentation unit 11 according to Embodiment 1. FIGS. 4 and 5 illustrate examples of processing operation of the segmentation unit 11 according to Embodiment 1. FIG. 6 shows examples of segmentation results according to Embodiment 1.

First, the segmentation unit 11 converts a color space of the first image, as shown in FIG. 3 (S201). Specifically, the segmentation unit 11 converts the first image from RGB color space into Lab color space.

The Lab color space is a color space perceptually even. In other words, in Lab color space, when a color value equally changes, the change perceived by a person is also equal when he/she looks at the change. Thus, the segmentation unit 11 can partition the first image along the boundary of the object of interest perceived by a person, by segmenting the first image in the Lab color space.

Next, the segmentation unit 11 sets centroids of k initial clusters (k is an integer of 2 or more) (S202). The centroids of the k initial clusters are set to be evenly placed on the first image, for example. Here, the centroids of k initial clusters are set such that the spacing between the adjacent centroids is S (pixels).

Next, processing of steps S203 and S204 is performed on each pixel in the first image. Specifically, the segmentation unit 11 calculates a distance Ds to the centroid of each cluster (S203). This distance Ds corresponds to a value indicating similarity defined using a pixel value and a pixel position. Here, it is shown that the shorter the distance Ds is, the higher the similarity of a pixel to the centroid of a cluster is.

It should be noted that as shown in FIG. 4, the segmentation unit 11 calculates the distance Ds between a pixel of interest i and a centroid Ck located in a distance calculation rage. Here, the distance calculation range is set to be positioned horizontally and vertically away from the position of the pixel of interest i by at most the centroid spacing S between initial clusters. In other words, the segmentation unit 11 calculates the distances between the pixel of interest i and centroids C2, C3, C6, and C7. Setting the distance calculation range in this manner achieves a reduction in a calculation load compared to when the distances to all the centroids are calculated.

The distance Ds between the centroid Ck (pixel position (xk, yk), pixel value (lk, ak, bk)) and the pixel of interest i (pixel position (xi, yi) pixel value (li, ai, bi)) is calculated by using Expression 1 below.

[Math. 1]

$$D_s = d_{lab} + \frac{m}{S}d_{xy}$$
$$d_{lab} = (l_k - l_i)^2 + (a_k - a_i)^2 + (b_k - b_i)^2$$
$$d_{xy} = (x_k - x_i)^2 + (y_k - y_i)^2$$

Expression 1

Here, m is a coefficient for achieving balance of the influence on a distance Ds exerted by a distance dlab based on a pixel value and a distance dxy based on a pixel position. This coefficient m may be predetermined experimentally or experientially.

Next, the segmentation unit 11 determines a cluster to which the pixel of interest i belongs, using distances Ds between the pixel of interest i and the centroids (S204). Specifically, the segmentation unit 11 determines a cluster having a centroid whose distance as is the shortest, as a cluster to which the pixel of interest i belongs.

Such processing of steps S203 and S204 is repeated for all the pixels included in the first image, to determine clusters to which the pixels belong.

Next, the segmentation unit 11 updates the centroid of each cluster (S205). For example, a pixel value and a pixel position of centroid C6 are updated if a rectangular cluster changes to a hexagonal cluster as shown in FIG. 5 as a result of determining clusters to which pixels belong in step S204.

Specifically, the segmentation unit 11 calculates a pixel value of a new centroid (lk_new, ak_new, bk_new) and a pixel position (xk_new, yk_new) following Expression 2.

[Math. 2]

$$l_{k\_new} = \frac{1}{N} \sum_{i=0, i \in k}^{N} l_i; \quad a_{k\_new} = \frac{1}{N} \sum_{i=0, i \in k}^{N} a_i;$$

$$b_{k\_new} = \frac{1}{N} \sum_{i=0, i \in k}^{N} b_i$$

$$x_{k\_new} = \frac{1}{N} \sum_{i=0, i \in k}^{N} x_i; \quad y_{k\_new} = \frac{1}{N} \sum_{i=0, i \in k}^{N} y_i$$

Expression 2

Here, the segmentation unit 11 ends processing if the centroid of each cluster is converged (Yes of S206). In other words, the segmentation unit 11 ends segmentation if the centroid of each cluster shows no change before and after the update in step S205, whereas the segmentation unit 11 repeats processing of steps S203 to S205 if the centroid of each cluster is not converged (No in S206).

In this way, the segmentation unit 11 can partition the first image into plural segments by clustering (here, k-means clustering) based on the similarity defined using pixel values and pixel positions. Thus, as shown in FIG. 6, the segmentation unit 11 can partition the first image into plural segments, according to a feature of the object of interest included in the first image.

In other words, the segmentation unit 11 can partition the first image into plural segments while avoiding inclusion of plural objects in one segment. As a result, the segmentation unit 11 can partition the first image into plural segments such that the boundary of a segment and the boundary of an object match.

It should be noted that k-means clustering is comparatively simple clustering. Consequently, the segmentation unit 11 performs segmentation based on k-means clustering, to achieve a reduction in processing load for segmentation. However, the segmentation unit 11 does not necessarily need to perform segmentation based on k-means clustering. In other words, the segmentation unit 11 may perform segmentation based on other clustering techniques. For example, the segmentation unit 11 may perform segmentation based on mean-shift clustering. It should be noted that the segmentation unit 11 does not necessarily need to perform segmentation based on a clustering technique.

Figure 7:
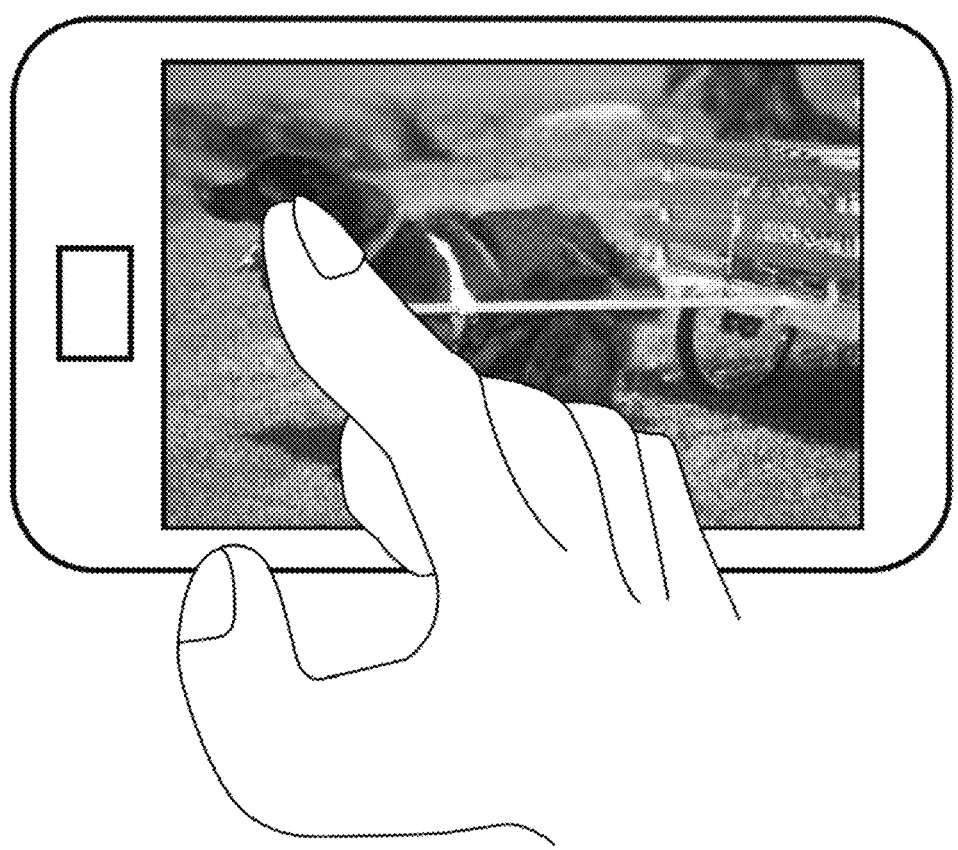
FIG. 7 illustrates an example of processing operation of an indication unit according to Embodiment 1.

Next, a detailed description is given of indication processing (S102) using FIG. 7.

FIG. 7 illustrates an example of processing operation of the indication unit 12 according to Embodiment 1. In FIG. 7, the indication unit 12 indicates the position of a touch on the touch screen made by the user, as a position of an object of interest. A touch screen detects the position of a touch made by the user by, for example, a resistance film method, a capacitive sensing method, or the like.

The indication unit 12 indicates the position of an object of interest based on the position of a touch on the touch screen made by the user. Consequently, the user can indicate the position of an object of interest with ease merely by touching a touch screen.

It should be noted that the indication unit 12 may indicate a point on a touch screen, as a position of an object of interest. In addition, the indication unit 12 may indicate a position of an object of interest, based on a path on a touch screen. In this case, the indication unit 12 may indicate plural points on the path on the touch screen as positions of the object of interest. In addition, the indication unit 12 may indicate an area enclosed by a path on the touch screen as a position of an object of interest.

In addition, the indication unit 12 does not necessarily need to obtain a position input by the user via the touch screen. For example, the indication unit 12 may indicate, as a position of an object of interest, a position on the display input by the user using an operation button, for instance.

Figure 8:
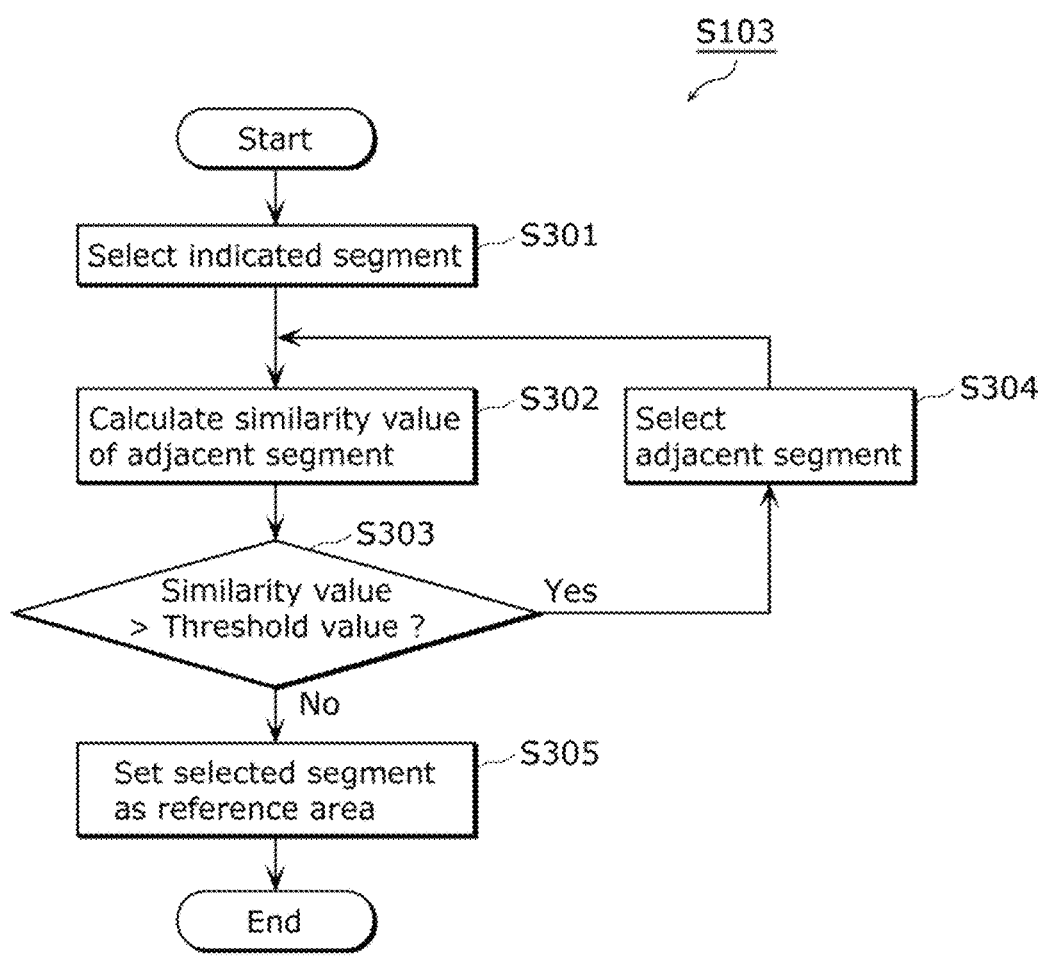
FIG. 8 is a flowchart showing details of processing operation of a reference area setting unit according to Embodiment 1.

Next, a detailed description is given of processing of setting a reference area (S103), using FIGS. 8 and 9.

FIG. 8 is a flowchart showing details of processing operation of the reference area setting unit 13 according to Embodiment 1. FIG. 9 illustrates an example of processing operation of the reference area setting unit 13 according to Embodiment 1.

As shown in FIG. 8, first, the reference area setting unit 13 selects an indicated segment (S301). Next, the reference area setting unit 13 calculates a value (hereinafter a "similarity value") indicating the image similarity between the indicated segment and a segment (hereinafter an "adjacent segment") adjacent to the segment selected in step S301 or S304 (hereinafter, referred to as a "selected segment") (S302). Specifically, the reference area setting unit 13 calculates, as a similarity value, a value indicating the degree of overlap between a color histogram of the indicated segment and a color histogram of the adjacent segment, for example.

If the similarity value is greater than a threshold value (Yes in S303), the reference area setting unit 13 selects the adjacent segment as a similar segment (S304), and the processing returns to step S302 again. If the similarity value is smaller than a threshold value (No in S303), the reference area setting unit 13 sets an area including the selected segment, as a reference area (S305). In other words, the reference area setting unit 13 sets a segment selected in step S301 and S304, as a reference area.

By performing processing as in the above, the reference area setting unit 13 can set, as a reference area, a segment set which includes an indicated segment and a similar segment having a value greater than a threshold value, the value indicating image similarity to the indicated segment. For example, if the position of an object of interest is indicated as shown in (a) of FIG. 9, the reference area setting unit 13 can set, as a reference area 101, an area which includes an indicated segment and similar segments in the first image 100 as shown in (b) of FIG. 9.

It should be noted that if there are plural adjacent segments, the reference area setting unit 13 may execute processing of steps S302 to S304 for each adjacent segment.

In addition, a similarity value does not necessarily need to be a value indicating the degree of overlap between color histograms. For example, a similarity value may be a value which indicates a difference in the mean color between two segments. In addition, a similarity value may be a value indicating the similarity in luminance, lightness, or saturation, rather than color.

Furthermore, a similarity value may be a value also indicating similarity in position, in addition to image similarity. In this case, the farther a segment is from an indicated segment, the smaller similarity value the segment has.

Next, a description is given of processing for tracking an object of interest to locate the object of interest in the third image, with reference to the drawings. FIG. 10 is a flowchart showing processing for tracking an object of interest performed by the image processing device 10 according to Embodiment 1.

First, the interest area setting unit 15 sets an area of interest in the third image (S151). Next, the segmentation unit 11 partitions the third image into plural segments based on the similarity between pixel values (S152). Here, the segmentation unit 11 partitions only an area of interest in the third image into plural segments. In this manner, the segmentation unit 11 can reduce an amount of calculation for segmentation, thereby increasing the processing speed. It should be noted that the details of segmentation are substantially the same as that of the segmentation of the first image shown in FIG. 3, and thus a detailed description thereof is omitted.

Finally, the tracking unit 16 determines for each segment included in an area of interest whether the segment is an interest object segment, using an interest object feature quantity and a non interest object feature quantity, to thereby locate the object of interest in the third image (S153).

In this manner, the image processing device 10 can track the object of interest included in the first image to locate the object of interest in the third image. It should be noted that the image processing device 10 obtains plural images captured in succession after the first image each as the third image in time order, to thereby track an object of interest in those plural images.

It should be noted that the image processing device 10 does not necessarily need to process the steps in the order shown in FIG. 10. For example, the image processing device 10 may execute step S151 after step S152. Further, for example, the image processing device 10 may execute steps S151 and S152 in parallel.

In the following, a further detailed description is given of processing for tracking an object of interest in such third images, with reference to the drawings. First, a detailed description is given of interest area setting processing (S151) using FIGS. 11 to 15.

Figure 12:
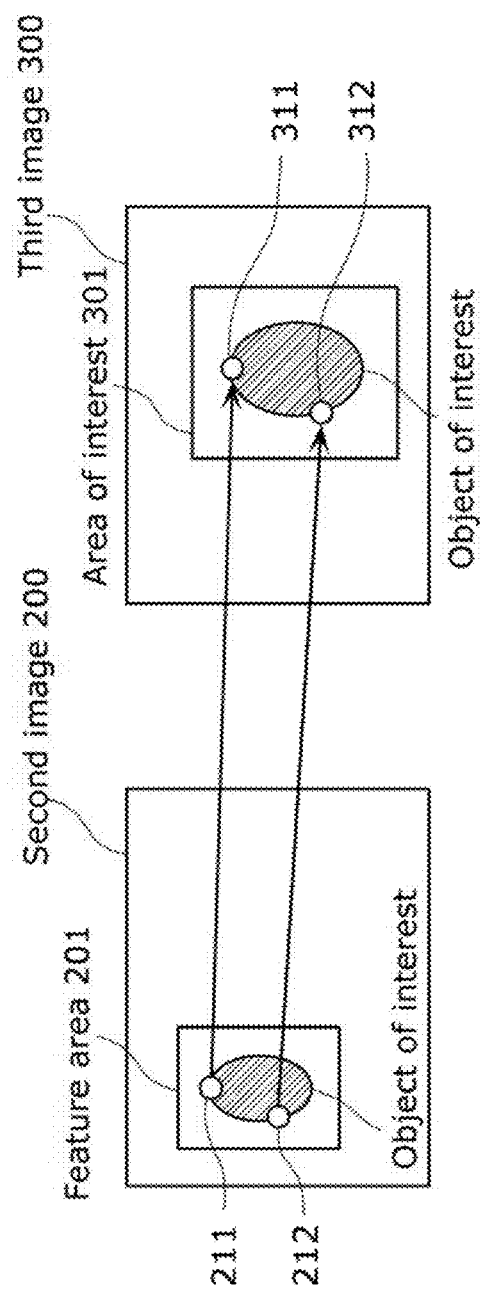
FIG. 12 illustrates details of processing operation of the interest area setting unit according to Embodiment 1.

FIG. 11 is a flowchart showing details of processing operation of the interest area setting unit 15 according to Embodiment 1. FIG. 12 illustrates details of processing operation of the interest area setting unit 15 according to Embodiment 1.

First, the interest area setting unit 15 sets a feature area in the second image, as shown in FIG. 11 (S401). Here, the interest area setting unit 15 sets in the second image, as a feature area, an area which includes an interest object segment determined by the tracking unit 16 and is larger than the interest object segment, for example. For example, if the first image and the second image are the same, the interest area setting unit 15 sets, as a feature area, an area which includes a reference area and is larger than the reference area.

Generally, a feature point having a distinctive feature quantity tends to be extracted at a position at which a pixel value greatly changes, such as a boundary of an object. Thus, the accuracy of detecting corresponding points can be improved by setting a feature area to be greater than an area corresponding to an object of interest such that the boundary of the object of interest is included.

Here, a description is given of the case where a feature area has a rectangular shape, although a feature area may have any shape. For example, in FIG. 12, the interest area setting unit 15 sets, as a feature area 201, an area enclosed in a rectangular obtained by multiplying sides of a rectangular circumscribed around an interest object segment by a predetermined number.

After that, the interest area setting unit 5 extracts at least one feature point from a feature area (S402). Specifically, the interest area setting unit 15 first calculates at least one local feature quantity showing the second feature from an image in a' feature area. Here, a local feature quantity is a feature quantity regarding a shape, and is calculated using, for example, scale-invariant feature transform (SIFT) or speeded up robust feature (SURF). NPLs 1 and 2 describe in detail SIFT and SURF, and thus a description thereof is omitted.

It should be noted that although a local feature quantity does not necessarily need to be calculated using SIFT or SURF, a local feature quantity preferably has robustness against rotation or size fluctuation, as SIFT or SURF. In this manner, the robustness against rotation or size variation of an object of interest can be improved in setting an area of interest.

Furthermore, the interest area setting unit 15 extracts plural feature points from a feature area based on local feature quantities calculated in the above manner. In other words, the interest area setting unit 15 extracts points having distinctive local feature quantities, as feature points. In FIG. 12, feature points 211 and 212 are extracted from the feature area 201 of the second image 200.

Next the interest area setting unit 15 detects plural sets of corresponding points based on the local feature quantities (S403). Corresponding points indicate a pair of corresponding feature points in the second and third images. In other words, the interest area setting unit 15 detects feature points in the third image having local feature quantities similar to those of the plural feature points extracted from the feature area. For example, in FIG. 12, feature points 311 and 312 are detected as feature points corresponding to the feature points 211 and 212, respectively.

Figure 13:
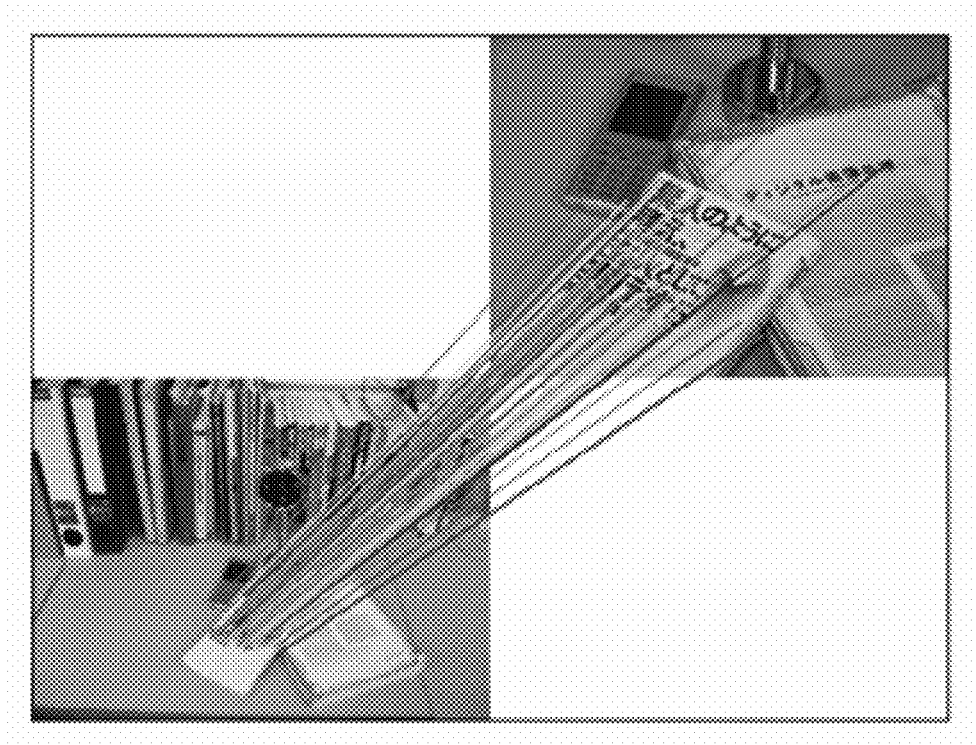
FIG. 13 shows examples of results of detecting corresponding points in Embodiment 1.

FIG. 13 shows examples of corresponding points detected based on SURF. In FIG. 13, it can be seen that corresponding points can be detected even if the size of an object of interest changes or an object of interest rotates between images.

Next, the interest area setting unit 15 calculates at least one motion vector from plural sets of detected corresponding points (S404). For example, the interest area setting unit 15 calculates a representative vector of plural vectors obtained from plural sets of corresponding points, as a motion vector. A representative vector is a vector obtained from a statistical representative value (average value, median, or mode, for instance). For example, in FIG. 12, the interest area setting unit 15 calculates, as a motion vector (Mx, My), a mean vector of a vector obtained from the feature points 211 and 311 and a vector obtained from the feature points 211 and 311.

Figure 14A:
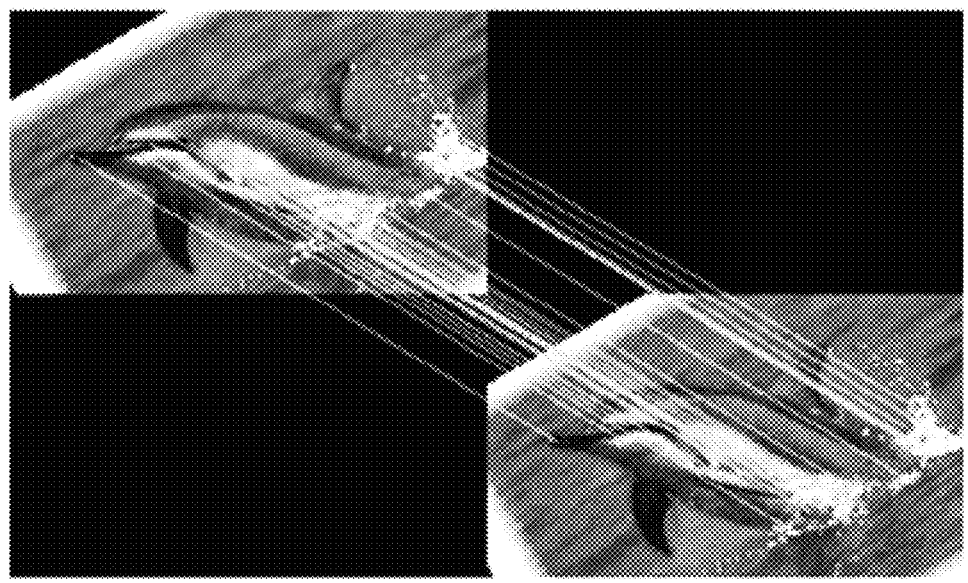
FIG. 14A shows examples of results of detecting corresponding points in Embodiment 1.
Figure 14B:
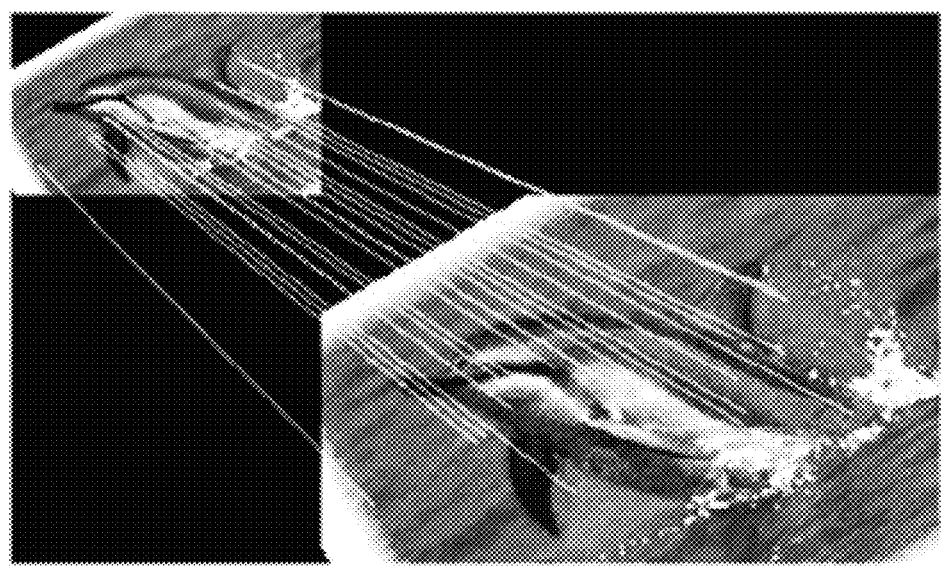
FIG. 14B shows examples of results of detecting corresponding points in Embodiment 1.

FIGS. 14A and 14B show examples of results of detecting corresponding points. Specifically, FIG. 14A shows examples of results of detecting corresponding points when an object of interest translates. Further, FIG. 14B shows examples of results of detecting corresponding points when an object of interest is reduced in size. As shown in FIGS. 14A and 14B, even if an object of interest translates or the size of an object of interest varies, straight lines connecting corresponding points are in substantially the same direction. In other words, vectors connecting corresponding points can be estimated as motion vectors of an object of interest.

It should be noted that as a method for improving robustness, a representative vector may be calculated using the median, rather than an average value. It is preferable to change a method of calculating a representative vector, according to a required processing speed, a movement speed of an object of interest, or the like.

Next, the interest area setting unit 15 calculates a degree of change in the distance between plural feature points in the third image corresponding to plural feature points extracted from the feature area relative to the distance between plural feature points extracted from the feature area (S405). For example, in FIG. 12, the interest area setting unit 15 calculates a degree of change (Dx2/Dx1, Dy2/Dy1) of the distance between the feature points 311 and 312 (Dx2, Dy2) relative to the distance between the feature points 211 and 212 (Dx1, Dy1).

FIG. 15 illustrates an example of processing for calculating a degree of change in the distance between feature points in Embodiment 1.

As shown in FIG. 15, the interest area setting unit 15 selects two feature points from plural feature points in the second image. Then, the interest area setting unit 15 calculates the horizontal distance and the vertical distance between the selected two feature points.

Furthermore, the interest area setting unit 15 selects two feature points in the third image corresponding to the two feature points selected in the second image. Then, the interest area setting unit 15 calculates the horizontal distance and the vertical distance between the two feature points selected in the third image.

At this time, the interest area setting unit 15 calculates, for both the horizontal and vertical directions, the ratio of the calculated distance in the third image to the calculated distance in the second image, as a degree of change.

The interest area setting unit 15 calculates, from all the combinations of the feature points, the degrees of horizontal and vertical changes calculated in the above manner. Then, the interest area setting unit 15 calculates, as a degree of change in the distance between plural feature points, an average of the degrees of horizontal and vertical changes calculated from all the combinations of the feature points. Here, assuming that an object of interest moves linearly, a degree of change in the size of a tracked object in the horizontal and vertical directions is substantially the same as calculated degree of changes in the horizontal and vertical distances.

Next, the interest area setting unit 15 sets, at a position according to the motion vector calculated in step S404, an area of interest having a size according to the degree of change in distance calculated in step S405 (S406). For example, suppose that the centroid position of a feature area is (Xg, Yg), and the size of the feature area is (Sx, Sy) in FIG. 12. In this case, the interest area setting unit 15 sets, in the third image 300, an area of interest 301 whose centroid position is (Xg+Mx, Yg+My) and size is (Sx*Dx2/Dx1, Sy*Dy2/Dy1), for example.

Figure 16:
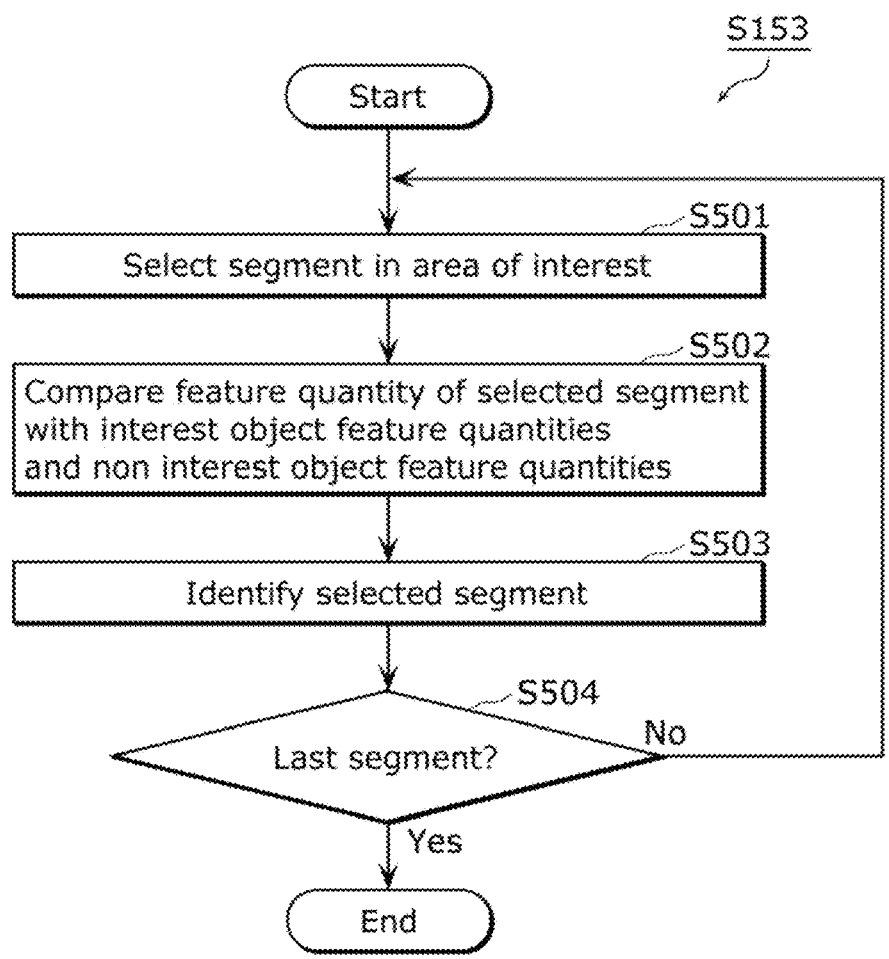
FIG. 16 is a flowchart showing details of processing operation of a tracking unit according to Embodiment 1.

Next, a detailed description is given of tracking processing (S153) using FIG. 16. FIG. 16 is a flowchart showing details of processing operation of the tracking unit 16 according to Embodiment 1.

First, the tracking unit 16 selects one segment in an area of interest (S501). In other words, the tracking unit 16 selects, in an area of interest, a segment which has not been selected yet.

Next, the tracking unit 16 compares a feature quantity of the selected segment with interest object feature quantities and non interest object feature quantities (S502). Specifically, the tracking unit 16 compares a color histogram of the selected segment with interest object color histograms and non interest object color histograms, for example.

The tracking unit 16 determines based on the comparison result whether the selected segment is an interest object segment (S503). For example, the tracking unit 16 determines that the selected segment is an interest object segment if a histogram most similar to the color histogram of the selected segment is one of the interest object color histograms.

Here, if the selected segment is the last selected segment (Yes in S504), the processing ends, whereas if the selected segment is not a segment selected last in the area of interest (No in S504), the processing returns to step S501.

An area constituted by the interest object segment determined in the above manner corresponds to an area corresponding to an object of interest. In other words, the tracking unit 16 can locate the object of interest in a target image.

As described above, according to the image processing device 10 according to the present embodiment, a reference area can be set using plural segments obtained by partitioning the first image based on the similarity between pixel values. Consequently, even if an object of interest has a complicated geometrical shape, the image processing device 10 can set a reference area having a shape suitable for such a complicated geometrical shape. As a result, the image processing device 10 can extract a feature quantity of the object of interest more appropriately than to extract a feature quantity from an area having a predetermined shape. Thus, the image processing device 10 can track an object of interest with high accuracy by using a feature quantity of the object of interest extracted in the above manner.

Furthermore, according to the image processing device 10 according to the present embodiment, using an interest object feature quantity, it is possible to determine for each segment included in an area of interest whether the segment is a segment corresponding to an object of interest. Consequently, the image processing device 10 can track an object of interest more robustly against a change in the shape of the object of interest between images, than when matching segments in a reference area and segments in the area of interest one by one. In other words, the image processing device 10 can track an object of interest with high accuracy even if the shape of the object of interest changes between images. Further, the image processing device 10 can limit a segment to be subjected to determination processing to a segment in an area of interest, thus achieving a reduction in processing load and an increase in processing speed.

Furthermore, according to the image processing device 10 according to the present embodiment, an area of interest can be set in the third image based on a relationship between a position of a feature point extracted from a feature area in a second image and a position of a feature point in a third image corresponding to the extracted feature point. Consequently, the image processing device 10 can appropriately set an area of interest with ease, utilizing correspondence between feature points in the second and third images, even if an object of interest moves between the second and third images. As a result, the image processing device 10 can prevent an incorrect determination that a segment at a position away from an object of interest is a segment corresponding to the object of interest. In other words, the image processing device 10 can track an object of interest with high accuracy even when an object of interest moves between images.

In particular, according to an image processing device according to the present embodiment, both of the following are performed: processing of setting an area of interest utilizing a feature quantity regarding a shape; and tracking processing based on the similarity between color-related feature quantities extracted from segments obtained by partitioning an image based on pixel values. In other words, robustness against the movement of an object of interest can be improved by the former processing of setting an area of interest, whereas robustness against the change in the shape of an object of interest can be improved by the latter tracking processing. As a result, it is possible to accurately track an object of interest for a long time.

Further, according to an image processing device according to the present embodiment, a local feature quantity is calculated only in a feature area in the second image, thus achieving a reduction in load compared to when a local feature quantity is calculated from the entire second image. For example, if a local feature quantity is calculated in accordance with SIFT, the amount of calculation is usually large, and thus calculation of a local feature quantity only from the inside of a feature area can greatly contribute to a reduction in the amount of calculation. For example, if a local feature quantity is calculated in accordance with SURF, the amount of memory usage is usually large, and thus calculation of a local feature quantity only from the inside of a feature area can greatly contribute to a reduction in the amount of memory usage.

Embodiment 2

Figure 17:
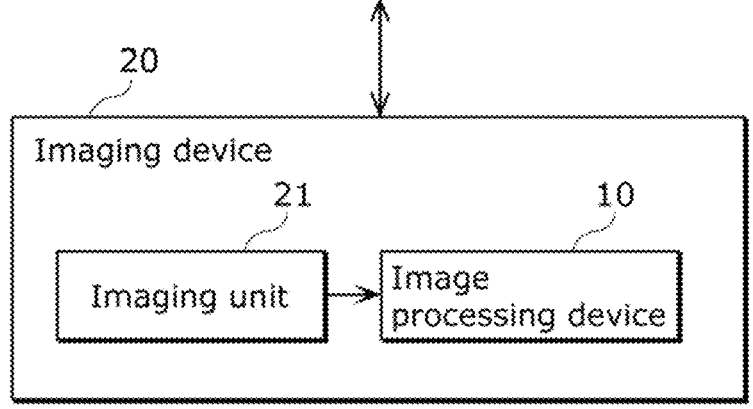
FIG. 17 is a block diagram showing a configuration of an imaging device according to Embodiment 2.

FIG. 17 is a block diagram showing a functional configuration of an imaging device 20 according to Embodiment 2. The imaging device 20 is a digital still camera or a digital video camera, or a mobile phone, a smartphone, a tablet computer, or the like which includes such a camera, for example. As shown in FIG. 17, the imaging device 20 includes an imaging unit 21 and the image processing device 10 according to Embodiment 1 described above.

The imaging unit 21 includes an optical system and an image sensor, for example. An optical system has at least one optical lens, for example. An image sensor is a solid-state image sensor such as a charge-coupled device (CCD) image sensor or a complementary metal oxide semiconductor (CMOS) image sensor, for example.

The imaging unit 21 captures plural images in succession. The plural images captured by the imaging unit 21 are input to the image processing device 10, and are used for various types of processing as a first image, a second image, and a third image.

It should be noted that the imaging device 20 may further include both or one of a display unit and an input unit (both the units are not illustrated). For example, a touch screen may be provided as the display unit and the input unit.

The input unit receives, from a user, input of a position of an object of interest in an image (first image) displayed on the display unit. The display unit displays captured images, and also displays a result of tracking by the image processing device 10.

Although the above describes the image processing device and the imaging device according to one or more aspects of the present invention, based on the embodiments, the present invention is not limited to the above embodiments. Various modifications to the embodiments that may be conceived by those skilled in the art and embodiments obtained by combining constituent elements in different embodiments may be included within the scope of one or more aspects of the present invention, unless departing from the spirit of the present invention.

For example, in the above embodiments, the extraction unit 14 does not necessarily need to extract a non interest object feature quantity. In other words, the extraction unit 14 may extract only an interest object feature quantity. In this case, the tracking unit 16 may locate an object of interest in the third image, without using a non interest object feature quantity. Specifically, the tracking unit 16 may determine for each segment included in an area of interest whether the segment is an interest object segment by determining, for example, whether a value indicating the similarity between an interest object feature quantity and a feature quantity of each segment included in an area of interest exceeds a threshold value.

Further, in the above embodiments, a feature quantity for determining an interest object segment and a feature quantity for setting an area of interest show features different from each other. In other words, the first feature and the second feature are features different from each other in the above embodiments. However, the first feature and the second feature do not necessarily need to be features different from each other, and may be the same feature.

Further, in the above embodiments, the extraction unit 14 does not necessarily need to extract an interest object feature quantity or a non interest object feature quantity for each segment. Specifically, the extraction unit 14 may extract one typical feature quantity from a feature area or an area outside the feature area, as an interest object feature quantity or a non interest object feature quantity.

For example, the extraction unit 14 may extract a representative value of plural feature quantities extracted from plural segments, as an interest object feature quantity, if plural segments are included in a reference area. This allows the image processing device 10 to achieve a reduction in processing load and an increase in processing speed when determining for each segment included in an area of interest whether the segment is a segment corresponding to an object of interest, using an interest object feature quantity.

For example, the extraction unit 14 may extract a representative value of plural feature quantities extracted from plural segments, as a non interest object feature quantity if plural segments are included in an area outside a reference area. This allows the image processing device 10 to achieve a reduction in processing load and an increase in processing speed when determining for each segment included in an area of interest whether the segment is a segment corresponding to an object of interest, using a non interest object feature quantity.

It should be noted that a representative value is a statistical representative value. Specifically, a representative value is the average, median, or mode, for example.

Further, in the above embodiments, although the interest area setting unit 15 sets an area of interest based on both a motion vector and a degree of change in the distance, the interest area setting unit 15 may set an area of interest only based on one of a motion vector and a degree of change in the distance. For example, if an area of interest is set based on a motion vector, plural feature points do not necessarily need to be extracted from a feature area, and only one feature point may be extracted. In other words, an area of interest may be set based on one set of corresponding points, rather than plural sets of corresponding points.

Further, an interest area feature quantity and a non interest area feature quantity may be updated or added when plural images captured in succession after the first image are obtained each as the third image in time order, and then an object of interest is tracked in those plural images. For example, both or one of an interest area feature quantity and a non interest area feature quantity may be extracted from the second image.

Further, the extraction unit 14 may extract an interest object feature quantity only from a segment having less blurring. In other words, the extraction unit 14 does not need to extract an interest object feature quantity from a segment with much blurring. In this case, if, for example, a value indicating a blurring degree of a segment is smaller than a threshold value, the extraction unit 14 extracts an interest area feature quantity from the segment. The value indicating a blurring degree may be determined based on, for example, a quantity of high frequency components or an edge quantity in an image within a segment.

Further, in the above embodiments, although the image processing device 10 sets an area of interest in the third image, based on the positional relationship between corresponding points in the second image and the third image, the image processing device 10 may further set an area of interest using feature points of plural images. For example, the interest area setting unit 15 may calculate a motion vector and an acceleration vector, based on a positional relationship between corresponding points in three images including the second image and the third image. Then, the interest area setting unit 15 may determine the position of an area of interest, utilizing the motion vector and the acceleration vector. In this manner, an area of interest is set based on the positional relationship between corresponding points in three or more images, thereby achieving improvement in accuracy of tracking an object of interest which makes complicated movement.

Further, some or all of the constituent elements included in the imaging processing device in the above embodiments may be constituted by a single system large scale integration (LSI). For example, the image processing device 10 may include a system LSI which has the segmentation unit 11, the indication unit 12, the reference area setting unit 13, the extraction unit 14, the interest area setting unit 15, and the tracking unit 16.

The system LSI is a super multi-function LSI that manufactured by integrating multiple components in one chip, and is specifically a computer system configured so as to include a microprocessor, a read only memory (ROM), a random access memory (RAM), and so on. A computer program is stored in the ROM. The system LSI accomplishes its functions through the operation of the microprocessor in accordance with the computer program.

It should be noted that although the circuit is referred to as a system LSI here, the integrated circuit may also be referred to as an IC, an LSI, a super LSI, and an ultra LSI, depending on the difference in the degree of integration. Moreover, ways to achieve integration are not limited to the LSI, and a special circuit or a general purpose processor and so forth may also achieve the integration. A field programmable gate array (FPGA) that allows programming after LSI manufacturing or a reconfigurable processor that allows reconfiguration of the connections and settings of the circuit cells inside the LSI may also be used.

Furthers ore, if the advancement in semiconductor technology and/or another derivative technique to replace LSI appear in the future, the functional blocks can be integrated using such a technology. Possibilities in this regard include the application of biotechnology and the like.

One aspect of the present invention may not only be the above image processing device, but also an image processing method in which the distinctive constituent units included in the image processing device are used as steps. One aspect of the present invention may be a computer program for causing a computer to execute such distinctive steps included in the image processing method. One aspect of the present invention may be a computer-readable non-transitory recording medium having stored therein such a computer program.

It should be noted that in the above embodiments, each of the constituent elements may be configured by dedicated hardware, or may be obtained by executing a software program suitable for the constituent elements. Each constituent element may be obtained by a program execution unit such as a CPU or a processor reading and executing a software program recorded on a recording medium such as a hard disk or semiconductor memory. Here, the software which achieves the image processing device in the above embodiments and the like is a program as will be described below.

Specifically, this program causes a computer to execute partitioning the first image into plural segments, based on similarity between pixel values; indicating a position of the object of interest in the first image; setting, as a reference area, a segment set which includes an indicated segment that is one of the plural segments at the indicated position; extracting a feature quantity indicating a first feature from the reference area, as an interest object feature quantity; setting an area of interest in the third image, based on a relationship between a position of a feature point extracted from a feature area and a position of a feature point in the third image corresponding to the extracted feature point, the feature area being an area corresponding to the object of interest and included in a second image captured at a time different from a time at which the third image is captured; partitioning the third image into plural segments, based on similarity between pixel values; and locating the object of interest in the third image by determining for each of two or more of the plural segments included in the area of interest with use of the interest object feature quantity whether the segment is a segment corresponding to the object of interest.

INDUSTRIAL APPLICABILITY

An image processing device and an imaging device according to an aspect of the present invention are useful as an image processing device which can track an object of interest included in a first image to locate the object of interest in a third image captured after the first image, and an imaging device such as a digital still camera and a digital video camera each including the image processing device.

REFERENCE SIGNS LIST

10 Image processing device
11 Segmentation unit
12 Indication unit
13 Reference area setting unit
14 Extraction unit
15 Interest area setting unit
16 Tracking unit
20 Imaging device
21 Imaging unit
100 First image
102 Reference area
200 Second image
201 Feature area
211, 212, 311, and 312 Feature point
300 Third image
301 Area of interest

The invention claimed is:

1. An image processing device which tracks an object of interest included in a first image to locate the object of interest in a third image captured after the first image, the image processing device comprising a microprocessor programmed to function as:
   a segmentation unit configured to partition the first image and the third image each into plural segments, based on pixel positions, and according to similarity between pixel values so that each segment is a group of pixels having pixel values similar to one another;
   an indication unit configured to indicate a position of the object of interest in the first image and to indicate an indicated segment that includes the position of the object of interest, the indicated segment being one of the plural segments in the first image;
   a reference area setting unit configured to calculate a similarity value indicating a degree of overlap between a color histogram of the indicated segment and a color histogram of an adjacent segment that is adjacent to the indicated segment, and select from among the plural segments, as a reference area, (i) a segment set which includes the indicated segment and the adjacent segment that is adjacent to the indicated segment when the calculated similarity value is greater than a threshold value, and (ii) a segment set which includes the indicated segment and does not include the adjacent segment when the calculated similarity is smaller than the threshold value;
   an extraction unit configured to extract a feature quantity indicating a first feature from the reference area, as an interest object feature quantity, and to extract, as a non interest object feature quantity, a feature quantity indicating the first feature from an area outside the reference area;
   an interest area setting unit configured to:
   set as a feature area an area corresponding to the object of interest and included in a second image captured at a time different from a time at which the third image is captured, extract a feature point from the feature area in the second image, and
   set an area of interest in the third image, based on a relationship between a position of the extracted feature point extracted from the feature area in the second image and a position of a feature point in the third image corresponding to the extracted feature point; and
   a tracking unit configured to:
   locate the object of interest in the third image by determining whether the segment is a segment corresponding to the object of interest, for each of two or more of the plural segments included in the area of interest by determining, for each of feature quantities indicating the first feature and extracted from the two or more segments, whether the feature quantity is similar to the interest object feature quantity or to the non interest object feature quantity, and
   determine that an area constituted by one or more segments each determined to be corresponding to the object of interest is the area corresponding to the object of interest,
   wherein the interest area setting unit is configured to detect, in the third image, plural feature points corresponding to a plurality of the feature points extracted from the feature area, based on a feature quantity indicating a second feature different from the first feature, and set the area of interest to have a size according to a degree of change in a distance between the detected plural feature points in the third image relative to a distance between the plurality of feature points extracted from the feature area in the second image, and
   a size of the area of interest is calculated by multiplying the degree of change in the distance by a size of the feature area.

2. The image processing device according to claim 1, wherein the interest area setting unit is configured to set, as the feature area, an area which includes the reference area and is larger than the reference area.

3. The image processing device according to claim 1, wherein the interest area setting unit is configured to detect, in the third image, a feature point corresponding to the feature point extracted from the feature area in the second image, based on a feature quantity indicating a second feature different from the first feature, and set the area of interest to be at a position according to a motion vector obtained from the detected feature point in the third image and the feature point extracted from the feature area.

4. The image processing device according to claim 1, wherein the feature area includes at least one segment corresponding to the object of interest, and is larger than the at least one segment corresponding to the object of interest.

5. The image processing device according to claim 1, wherein the segmentation unit is configured to partition only the area of interest in the third image into plural segments.

6. The image processing device according to claim 1, wherein when the reference area includes plural segments, the extraction unit is configured to extract, as the interest object feature quantity, a representative value of plural feature quantities extracted from the plural segments.

7. The image processing device according to claim 1, wherein when the area outside the reference area includes plural segments, the extraction unit is configured to extract a representative value of plural feature quantities extracted from the plural segments, as the non interest object feature quantity.

8. The image processing device according to claim 1, wherein the first image, the second image, and the third image are included in a video.

9. The image processing device according to claim 1, wherein the image processing device is configured as an integrated circuit.

10. An imaging device comprising:
the image processing device according to claim 1; and
an imaging unit configured to capture the first image, the second image, and the third image.

11. An image processing method for tracking an object of interest included in a first image to locate the object of interest in a third image captured after the first image, the image processing method comprising:
partitioning the first image into plural segments, based on pixel positions, and according to similarity between pixel values so that each segment is a group of pixels having pixel values similar to one another;
indicating a position of the object of interest in the first image and an indicated segment that includes the position of the object of interest, the indicated segment being one of the plural segments in the first image;
calculating a similarity value indicating a degree of overlap between a color histogram of the indicated segment and a color histogram of an adjacent segment that is adjacent to the indicated segment, and selecting from among the plural segments, as a reference area, (i) a segment set which includes the indicated segment and the adjacent segment that is adjacent to the indicated segment when the calculated similarity value is greater than a threshold value, and (ii) a segment set which includes the indicated segment and does not include the adjacent segment when the calculated similarity is smaller than the threshold value;
extracting a feature quantity indicating a first feature from the reference area, as an interest object feature quantity;
extracting, as a non interest object feature quantity, a feature quantity indicating the first feature from an area outside the reference area;
setting as a feature area an area corresponding to the object of interest and included in a second image captured at a time different from a time at which the third image is captured;
extracting a feature point from the feature area in the second image;
detecting, in the third image, plural feature points corresponding to a plurality of the feature points extracted from the feature area, based on a feature quantity indicating a second feature different from the first feature;
setting an area of interest in the third image to have a size according to a degree of change in a distance between the detected plural feature points in the third image relative to a distance between the plurality of feature points extracted from the feature area in the second image, wherein a size of the area of interest is calculated by multiplying the degree of change in the distance by a size of the feature area;
partitioning the third image into plural segments, based on pixel positions, and according to similarity between pixel values so that each segment is a group of pixels having pixel values similar to one another;
locating the object of interest in the third image by determining whether the segment is a segment corresponding to the object of interest, for each of two or more of the plural segments included in the area of interest, by determining, for each of feature quantities indicating the first feature and extracted from the two or more segments, whether the feature quantity is similar to the interest object feature quantity or to the non interest object feature quantity, and determining that an area constituted by one or more segments each determined to be corresponding to the object of interest is the area corresponding to the object of interest.

12. A non-transitory computer-readable recording medium storing a program for causing a computer to execute the image processing method according to claim 11.

* * * * *